March 8, 1927.
C. T. HOLCROFT ET AL
1,620,022
ACT OF FIRING CERAMIC AND OTHER PRODUCTS
Filed May 12, 1924
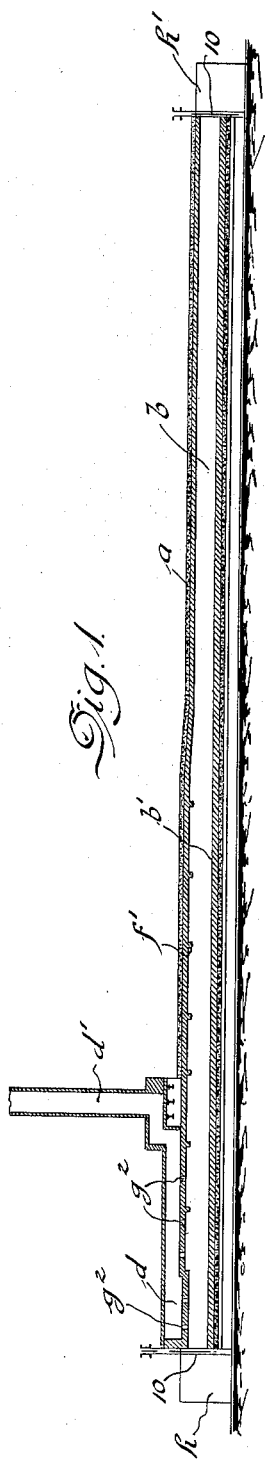
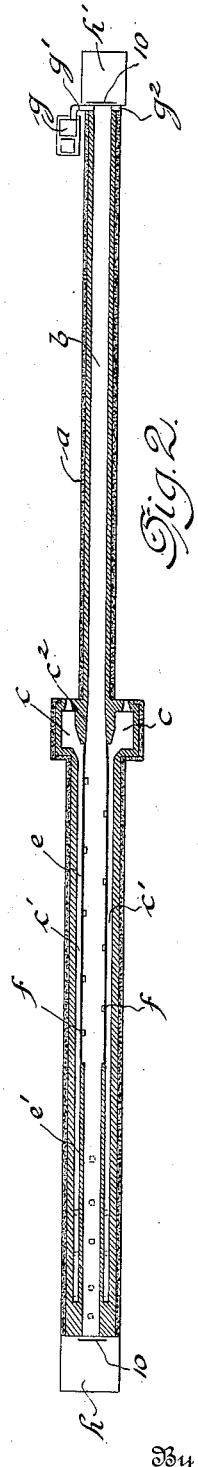
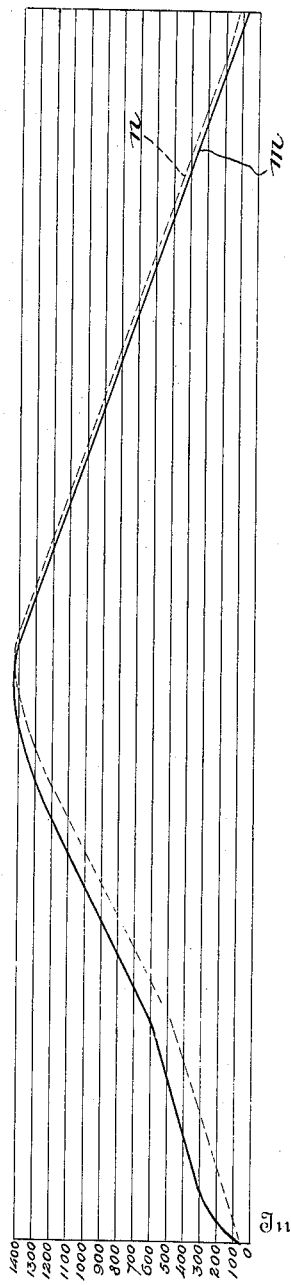
Inventors:
Charles T. Holcroft,
Charles E. Doll
By
Attorneys Patented Mar. 8, 1927.

1,620,022

UNITED STATES PATENT OFFICE.

CHARLES T. HOLCROFT, OF DETROIT, AND CHARLES E. DOLL, OF MOUNT CLEMENS, MICHIGAN.

ART OF FIRING CERAMIC AND OTHER PRODUCTS.

Application filed May 12, 1924. Serial No. 712,561.

This invention relates to improvements in the art of firing ceramic and other products and also to the firing of decorated ware for the purpose of fusing the applied materials thereon.

In producing pottery ware the process generally embodies three stages.

The first stage produces the "bisque" product, this stage taking the raw materials, forming them into the desired shape, drying the shaped articles to eliminate the major portion of the moisture, and then firing the dried embryo article; in the firing step of this stage the remaining moisture is first driven off, after which comes the development of the chemical reactions that take place as the applied temperature increases, these reactions becoming complete as the embryo ware reaches the peak temperature of the stage (approximately 2400° F.), to be succeeded by the cooling of the ware until it is cooled sufficiently to permit proper handling. It may be noted that in referring to temperatures, reference is made to the temperatures in the kiln.

The second stage involves the application of the glaze. The embryo piece of ware (dinner ware, for instance) receives a coating of the material which is to produce the glaze, is subjected to a drying action, and then is fired to fuse and set the glaze. In the firing step of this stage the peak temperature is approximately 2200° F., this peak being reached gradually, the ware then being permitted to cool gradually, completing the piece of ware with the exception of its decorations.

The third stage bears on the decorating activities, the decorations being applied onto the glaze, after which the ware is subjected to a third firing action to fuse the decoration upon the ware. In this stage the peak temperature in the kiln is approximately 1500° F., the ware being gradually brought to this temperature and then cooled to produce the finished product. It is the firing steps of these stages that form the primary subject-matter of the present invention.

As will be understood, the ware of each stage is subjected to high temperature conditions, the first firing presenting the highest peak, the third firing presenting the lowest peak; but it is obvious, of course, that in the second stage the ware will pass through many of the characteristics of the first stage up to the peak temperature of the second stage—the difference being in the fact that the chemical reactions of the bisque product were completed during the first stage, the second stage dealing more particularly with the reactions that take place on the surface of the ware. And this is true also with respect to the third firing within the limits of the peak temperature of the third stage. Hence, the ware is carried to the peak of the third stage in each of the stages; it is carried to the peak of the second stage during the first and the second stages, and to the peak of the first stage during this stage.

This is referred to more particularly to point out the conditions of a fundamental problem that is found in connection with the firing operations of the third stage, this being one of a number of problems that are required to be correctly solved in order to produce a proper and complete product. This problem will be understood by a brief comparison of characteristics of the different firing operations.

One of these characteristics—which can be used as a tell-tale—is found in the change in color of the ware at different temperatures. As the temperature rises, the ware passes first into what is termed a "black" color, this being simply an expression used to indicate the fact that inspection of the ware within the kiln presents no evidence of the presence of heat in the ware although heat is present; this is most noticeable during the descending temperature conditions. As the temperature rises, the ware passes to a deep red color, from which it passes into a light red color, and finally into a yellow-red color, this latter occurring when the temperature rise approaches its peak during the firing of the first stage, the peak of this stage presenting this as the color of the ware; a higher temperature will tend to damage the ware. In the second stage firing, the ware reaches the light red color, while in the third stage, the peak is within the deep red zone. The descending temperature conditions during cooling produce the color variation in the reverse order. The colors thus tend to set up the conditions of indicators and are referred to simply to indicate the location generally of the seat of this particular problem.

Within these temperature ranges is found what is termed a "tender" or a critical zone which includes a range of between 300° F. and 1600° F., the latter being within the deep red color zone with the former in the "black" zone. Within these temperatures strains and stresses are present in the ware, this being a zone in which the ware is not in plastic form but still subject to the conditions of expansion and contraction—expansion under ascending temperature conditions, and contraction under descending temperatures. During this period shattering of the ware is always possible; too rapid temperature rise or a too rapid temperature drop within this zone practically ensures shattering of the ware.

Since this zone is present in each stage the danger is present with each firing step. In the first stage the ascending temperatures are not as likely to produce this result, but it is present during the descending temperature conditions; it is present under both ascending and descending conditions in the second and third stages. This "tender" zone condition and its temperature range present one of the controlling differences between the activities of the stages.

As will be understood, the ware is carried to the peak temperature of a stage by an ascending temperature condition, whereupon the ware passes to the descending temperature conditions to permit cooling. During this particular period of passing the temperature peak the ware is subjected to the change from the conditions present at the ending of the expansion period to those which begin the contraction period. Prior to reaching this peak zone, the action has all been in the same direction—ascending temperatures leading to expansion; passing the peak, this uniformity in development is changed to the descending direction and the contracting action begins to continue until the ware is cooled.

In the first and second stages, this change from ascending to descending temperature conditions takes place well above the temperatures of the "tender" zone; in both stages, the "tender" zone is an intermediate part of the uniform development of temperature conditions. The tender zone is passed long before the ascending temperature condition ends, and the descending temperature uniformity has become well established before this zone is reached during the cooling operation.

The conditions, however, are different in the third stage. Here the peak is itself within the "tender" or critical zone, so that the change which ends the expansion condition and begins the contraction of the ware, takes place within this zone; the change is close to the upper limit of the range of this zone, so that the major portion of the heating and cooling activities take place within this zone—only at the beginning of the heating and the ending of the cooling periods is the ware free from this possibility of shattering.

The necessity for bringing about this change from the ascending to the descending temperature conditions while within this "tender" or critical zone of the ware is not due to the ware itself—the ware could be subjected to higher temperature conditions without damage. The difficulty is brought about by the decorating materials—the temperatures for properly fusing these colors, etc., reach their maximum within the range indicated. The gold used in striping, fuses at a lower temperature than that of the mineral colors—such as are applied by the decalcomania process, for instance; these latter generally fuse at the peak temperature indicated. If higher temperatures are used the colors become damaged and the ware decorations do not present the desired beauty nor are they lasting. The metal colors, such as gold, are not absorbed within the glaze—they are fused on the glaze, and the lasting qualities of the decoration are determined by the manner in which the ware is fired. On the other hand the mineral colors are absorbed by the glaze; if an insufficient heat is used, the absorption is incomplete and the colors can be washed off, or fail to develop proper shade of color.

The metal and the mineral ingredients require different fusing conditions; and this leads to one of the several problems present in the firing of decorated ware under quantity production conditions. A heat that is proper for the gold stripe for instance, will leave the mineral colors insufficiently fused; and a heat for the mineral colors will cause deterioration of the gold. In general practice, therefore, the two types of ware are fired separately in order to avoid these objectionable conditions; and this, in turn, tends to affect production.

Decorative ware firing is generally provided by the use of the periodic type of muffle kilns. Tunnel kilns have been employed for the firing step in the first and second stages, but these have not been generally employed in connection with the third or decorative firing stage. In the first and second stages the ware is carried in "saggars" and the cars containing the latter are carried through the heated tunnel, thus setting up conditions of a muffle action, but the firing is done in stagnant air, since the saggars are designed to keep out the products of combustion found in the tunnel kilns. A further reason, however, is the fact that it is desired to keep the ware from sudden changes in temperature during the range of the "tender" zone, so as to prevent shattering of the ware.

In the muffle type of periodic kiln, the action is periodic rather than continous; this is due to the fact that the ware can be introduced and taken out only when the oven is sufficiently cool to permit the workmen to place and remove the ware. This brings in one of the problems to be found in decorative ware firing—the deteriorating effect of the products of combustion on the decorating materials. On an ascending heat, expansion is present in the walls within which the ware is located, and hence there is likelihood of leakage of the products through the walls during the earlier heat ranges; and the same conditions apply on the descending heats. Since the firing is periodic—the kiln is filled with the ware to be fired, and remains in this condition until the firing cycle is completed—this alternate condition of expansion and contraction of walls is present with each firing operation, and hence there is a likelihood of air contamination in the space carrying the ware through leakage of the products of combustion.

One of the fundamental teachings and experiences that has been present throughout the commercial activity of pottery firing and the like, is that the firing must be done in stagnant air—air is not to be admitted to the chamber in which the firing is to take place, owing to the effect it would have in setting up the conditions of shattering the ware. It was well-known that if the firing could be done in the presence of complete oxygen conditions such as would be provided by bathing the ware with fresh air during decorative firing, the oxidation of the colors would be far superior and a more beautiful decoration would result. But this was considered as simply a dream—an ideal that was impractical—due to the fact that the tendency to shattering was largely increased by the attempt to supply the air.

These facts provide a setting in which to consider the present invention which is designed to provide for the firing of ceramic ware and kindred products, with the activities provided under quantity production conditions. Under the present invention the firing is carried on under continuous instead of periodic-operation conditions, and in the decorative firing stage, with the ware subjected to the firing cycle regardless of the character of the decorative materials.

In carrying out the methods of the present invention the firing is provided within a kiln or oven of the tunnel type, the kiln or oven being constructed on muffle-action conditions. In addition, the method includes that which, heretofore, has been believed to be impossible of successful operation—the ware is fired while bathed with air introduced into the firing chamber, being present and circulated through the tunnel throughout the length of travel of the ware through the tunnel. Not only is the air present but it is present under a pressure sufficient to counteract the pressures of the products of combustion outside of the muffle chamber, with the result that leakage of products of combustion to the muffle chamber is substantially eliminated. Further, in order to maintain a constant even pressure in all parts of the muffle chamber, throughout its length, the cross-sectional area of the chamber is increased at those parts of its length where the temperature increases and is contracted where the temperature is decreased, that is the cross-sectional area is varied in proportion to the temperature and consequent volume of air to maintain a substantially even internal air pressure in the chamber throughout its length.

An underlying characteristic of the invention is the discovery by us that it is possible to bathe the ware in air circulated through the muffle chamber under pressure, where the air and ware have temperatures that vary from each other but in which the variation is more or less uniform as to extent, and is within reasonable limits. In other words, by maintaining a comparatively constant variation during the periods of increasing and decreasing temperatures, it is possible to provide for crossing the peak zone—with its change in direction of activity—without setting up the tendency of shattering the ware; with the variation between the temperature of ware and air of relatively small amount, the changes which take place in the peak zone, and which have the effect of practically bringing the air and ware to an approximately equal temperature within the peak zone, are made gradually and with approximate uniformity, so that sudden changes are eliminated.

This discovery makes is possible to provide decorative firing under oxidizing conditions; and it has the additional advantage, in this respect, of permitting all firing operations to take place under these conditions and under the conditions of a comparatively short tunnel kiln as compared with those designed for cooling under natural cooling conditions. In addition, the discovery enables tunnel kiln operation under oxidizing temperature conditions, permitting kiln operation with higher temperatures and yet without requiring the use of kilns of an impracticable length.

An additional feature of the invention is the saving in fuel consumption. In an installation in which the invention is in actual use, it has been found that the cost of fuel is not more than 25% of the fuel cost of periodic muffle kilns designed for similar purposes. In addition, the time required to fire the ware is very materially reduced.

Other features that are advantageous are:

Uniformity of temperature as between the sides and the top and bottom of the ware carrier, providing for equal firing action on all of the ware carried.

Reduction in losses from "spitting out", "dunting", or cracking, over-firing or under-firing, burned gold or gold improperly set and which rubs off, and the destruction or deterioration of gold or colors from the stagnant atmosphere in the kiln or from the presence of sulphur, carbon monoxide, or other impure gases.

Giving to gold and colors a smoothness and bright glossy and lustre appearance that cannot be obtained regularly in other types of muffle kilns of either the periodic or continuous type.

As an entirety, the advantages resulting from practice of the method can be summed up as quantity of production during a given period, quality of production, and economy of production, the latter not only from a fuel-saving standpoint, but also because of simplicity of operation which permits the use of unskilled labor.

To these and other ends therefore, the nature of which will be readily understood as the invention is hereinafter more fully disclosed, said invention consists in the improved methods hereinafter more fully described, illustrated in the accompanying drawings, and more particularly pointed out in the appended claims.

In the accompanying drawings, in which similar reference characters indicate similar parts in each of the views, Figure 1 is a central longitudinal sectional view of a simple arrangement of kiln designed for the purpose of carrying out the present invention;

Fig. 2 is a horizontal sectional view of the same;

Fig. 3 is a temperature graph giving approximately the temperatures of the air and the ware at successive points in the length of the kiln of Figs. 1 and 2.

Figs. 1 and 2 illustrate a simple arrangement of kiln adapted to carry out the fundamental features of the present invention, the arrangement shown being somewhat diagrammatic. A companion application Serial Number 753,084 filed Dec. 1, 1924, discloses a kiln structure designed to carry out the present methods, and in which various structural refinements are utilized to enhance the activities under service conditions. Because of this fact, the present disclosure does not include specific details, sufficient being shown to permit of the method being practiced by those skilled in the art to which the invention pertains.

In the drawings, $a$ indicates generally a tunnel kiln construction of suitable structural formation, the construction being such as to provide a tunnel $b$ which extends throughout the length of the kiln, the ends of the tunnel being normally closed by doors 10, these being arranged to permit opening and closing for the admission of ware into and its discharge from the tunnel. In the drawings, the floor of the tunnel is indicated at $b'$; since the ware may be carried through the kiln in different ways, well known in the art, as by a conveyor structure or on cars travelling on tracks located on the floor, the showing of the floor is diagrammatic to indicate more particularly the dimension characteristics of the tunnel rather than the specific ware-conveying means. As disclosed in the companion application, we prefer to employ the car and track arrangement, the cars being introduced into the end shown at the left in Fig. 1, at spaced intervals of time, the tunnel becoming filled with cars so that the introduction of one car acts to advance the entire train of cars, and discharges the advance car through the door opening at the right-hand end of Fig. 1. This provides for an intermittent advance of the train of cars. This method of carrying the ware through the kiln is one that has been employed for many years in connection with oven kiln and furnace structures as evidenced by the following patents; Bennett, No. 48,761, July 11, 1865; Gillinder, No. 337,575, March 9, 1886; Lawton, et al., No. 405,571, June 18, 1889; Fellner, et al., No. 455,191, June 30, 1891, and Gery, No. 793,290, June 27, 1905, these being instances of the ware carrier being in the form of cars which are advanced intermittently through the tunnel. The conveyor type of kiln is indicated, for instance, in the patent to Hauze, No. 952,196, March 15, 1910.

The kiln is of the muffle type, the heat generating means being located within the offset indicated at $c$, this being at an intermediate portion of the length of the kiln, and, as shown, is of the type in which oil burners are used for the purpose of producing the heat, it being obvious, of course, that the heat could be provided in other ways, as for instance, by the use of coal fires or in any other suitable manner. The offset $c$ may thus be considered as the furnace part of the kiln.

As shown in Fig. 2, the products of combustion from the furnace are led toward the left in said figure, between the outer walls of the kiln and the muffle walls presently referred to, these walls forming channels $c'$ which lead toward the entrance end of the kiln and through which the products of combustion pass and finally discharge into a space or flue $d$ leading to a chimney $d'$ which provides for the draft conditions, channels $c'$ and flue $d$ being in communication adjacent the ends of the channels at the entrance end of the kiln, so that the products of combustion travel practically throughout the length of the channels and are then discharged into flue *d* to pass out of the chimney.

The muffle walls within the zone of activity of the products of combustion, have vertical portions practically in two zones in the embodiment shown in the drawing, although, this may vary. The zone *e* which reaches from the furnace to an intermediate point toward the entrance end of the tunnel is comparatively thin, and may be provided, for instance, of suitable sheets of heat radiating material, the thinness of the walls permitting of heat radiation with great facility; the portion of this wall, indicated at *e'* may be and preferably is thicker. The top of the kiln practically forms the top of the muffle with the exception of the portion which provides the flue *d*.

As shown, the portion of the kiln between the furnace *c* and the entrance, has the muffle walls so arranged as to set up variations in the cross-sectional dimensions of the tunnel. For instance, in Fig. 2, it will be seen that the tunnel portion between the walls *e'* are gradually spread apart so as to increase the dimensions between the walls as a car advances from the entrance. At the entrance end, the dimensions are such as to practically receive the laden car with but slight clearance, the spreading of the walls in the horizontal plane, and, as shown in Fig. 1, the increase in the height of the upper wall of the tunnel, increasing the clearance as the car advances, sufficient clearance being had to provide for the circulation action presently referred to. This variation in the cross-sectional area of the tunnel may be secured by forming a step or series of steps, or by a gradual increase or decrease, as by inclining or tapering the walls and crown longitudinally of the tunnel.

The expanding tunnel-cross-section begins at the entrance end and continues until it approaches the neck $c^2$ formed in the furnace where it is again contracted to provide for the small clearance conditions which continue to the exit end of the tunnel. The tunnel is therefore of greatest cross-sectional area where there is the greatest heat and is gradually contracted toward the cooler portions, so that in those parts of the tunnel where the greatest expansion of the air takes place, the tunnel will be correspondingly enlarged so that the internal air pressure in the tunnel will be substantially constant throughout the entire length. Within this expanded portion of the tunnel we prefer to employ baffles *f* at the sides, these being preferably arranged staggered, and baffles *f'* at the top, as shown in Figs. 1 and 2, these baffles being of dimensions such as to permit of the free travel of the cars through the tunnel, but which act to force the air to travel through the ware and to circulate as the cars advance in the heating portion of the tunnel.

As heretofore pointed out, the major feature of the present invention is that which provides for the firing of the ware in the presence of circulating air under pressure. This feature will be more particularly understood from the fact that at *g* is shown an air delivering instrumentality, such for instance, as a motor driven fan, the fan being designed to deliver atmospheric air into the tunnel practically at its exit end through a conduit *g'*. At the entrance and the exit ends of the tunnel, and outside of the doors 10, we prefer to employ vestibules *h*, *h'*, these tending to close the entrance to and the exit from the tunnel when the doors 10 are open, the vestibule *h* receiving the car that is to be added to the train and vestibule *h'* receiving the car that is taken from the train when a car is added to the train through the door from vestibule *h*. This arrangement reduces the amount of air that might be lost during the time when the train is being advanced by the introduction of one car and the discharge of another car, the purpose being to prevent, as far as possible, a loss of the air which is being introduced through channel *g'* excepting such as is discharged through the openings $g^2$ located in the top walls of the muffle adjacent the entrance end of the kiln or which escapes around the entrance door, these openings $g^2$ providing communication between the tunnel and flue *d*. In the installation heretofore referred to, the practice has been to introduce the atmospheric air at the rate of approximately 500 cubic feet per minute, which air is restricted in its escape at the entrance end of the tunnel, to provide internal air pressure in the tunnel.

As will be understood, the air introduced under the pressure of the instrumentality *g* is being discharged mainly through the entrance or opposite end of the tunnel, and since the cooling portion of the tunnel, which extends from furnace *c* to the discharge end, is of a cross sectional dimension such as to provide for but a small clearance for the car—the latter being more or less skeleton in structure—the air is forced to travel practically through the car and thus bathe the ware as well as the car structure with cool air as the air advances toward the entrance end of the kiln and gradually becomes heated. It is obvious, of course, that since the ware is at its highest temperature practically at the point where the furnace is located, the travel of the ware in the direction opposite to that in which the air is being forced, sets up the conditions of the possibility of heat exchange between the air and the ware. Within this portion of the tunnel, the air is always cooler than the ware, with result that the heat exchange is from the ware to the air. And, since this exchange is constantly acting to cool the ware, it will be readily understood that, at any cross section of the tunnel within this cooling zone, the temperature of the air will be less than that of the ware, although the difference in temperature between the ware and the air is comparatively small; for instance, it may not exceed 100° F., and designedly does not exceed 200° F.

The graph of the approximate conditions within this portion of the kiln is that shown at the right of Fig. 3, the temperature of the air being indicated by the solid line $m$, the temperature of the ware being represented by the dotted line $n$, which lines follow each other very closely throughout the cooling or discharge end portion of the kiln, with the temperature of air at a given distance from the end considerably greater than that of the ware at the same distance throughout the main portion of the entrance end and heating zone.

The variation limits as between the temperature of the air and that of the ware is maintained within the small compass shown by reason of these conditions of heat exchange. The cold air, as it enters, bathes the ware on the car about to be discharged, and as the temperature of the ware is higher than that of the air—the latter being room temperature—the air absorbs heat from the ware, and as the air advances to succeeding cars, its temperature has been increased by heat absorption but is still cooler than the ware on these succeeding cars. This action—which is the ordinary heat exchange action—continues throughout the length of the cooling zone, to more rapidly and uniformly reduce the temperature of the ware, and yet the action does not involve any sudden change in the temperatures of either ware or air, the reduction of temperature of the ware being more or less uniform, as is the increase of temperature of the air, the main factor in this being that the variations in differences in temperatures between the ware and the air remains substantially uniform or is varied more or less regularly, so that there is no sudden change in character of action produced upon the ware.

Upon reaching the furnace zone in its travel through the kiln, the air is at its highest temperature, since, at this portion the kiln temperature is greatest, as is also the temperature of the ware, and the air is caused by the baffles to circulate in contact with the ware. The ware and the air thus reach approximately the same temperatures within this zone, but as the air continues toward the entrance end of the kiln, its temperature while being gradually lowered as it approaches the kiln entrance, is still higher than that of the ware, the action thus providing generally for the characteristic shown at the top of the graph of Fig. 3, in which there is a point where the two lines cross each other, indicating that the temperature of ware and air are equal approximately at this point.

The advantage of this can be appreciated from the fact that although this point represents the point where the characteristics of the stresses change in the ware—the point where the action of expansion ends and that of contraction begins—the changes made under conditions where the air into which the car is passing is almost of the same temperature as that of the ware at the peak temperature of the latter, so that while there is the characteristics of a drop of temperature being forced, through the fact that the air, of less temperature than the ware, the difference in temperature is so small as not to materially affect the conditions of stress and the change from stresses set up by expansion to those set up by contraction are made so gradually and so naturally as to practically eliminate all possibilities of shattering of the ware within this zone. As the car proceeds, the variation in temperature between the two may tend to increase, but the progression of increase in variation is so small as to be ineffective to set up changes which would affect the contracting action in such manner as to set up shattering stresses.

It will be understood, of course, that the circulating action of the air which is caused by the baffles $f$ and $f'$ also has the effect of bringing the air into direct contact with the side walls $e$ which tend to keep the air heated, without, however, materially affecting the radiating action on the passing ware, set up by these walls. Hence this air which is giving up its temperature through heat exchange action with the advancing ware, is kept at a temperature above that of the ware through this heat exchange action with the walls $e$ throughout the high heat zone of the kiln. However, as the air becomes highly heated, it expands very materially, increasing its volume which would increase the internal pressure within the kiln and to prevent this increase of pressure at the high heat zone, this portion of the tunnel is increased in cross-sectional area to correspond with the increase in expansion. This increase may be in one or more steps in the inner surface of the tunnel wall, as shown, or may be a gradual outward slanting of the walls, and at those parts of the length of the tunnel where the air temperature decreases and where there is therefore less expansion of the air, the tunnel walls are drawn in any suitable construction to reduce the cross-sectional area and maintain uniform pressure.

Because of the air circulating feature within the zone to the left of the furnace in Fig. 2, it can be readily understood that there is more or less similarity in variation between the temperature of the ware and the air as is found on the cooling side. The variation may be of greater extent, as indicated by the graph, but the limits of this variation are not of such wide compass as would tend to set up the conditions of stress while the ware is within this critical or "tender" zone. Like the conditions within the cooling zone, there may be differences in the extent of the variation at spaced apart points, but these differences are so small that they do not set up the conditions of sudden change such as are conducive to producing the shattering effect.

The air within this portion of the tunnel is of a higher temperature than the ware, and the two move in opposite directions through this portion of the kiln. Since the ware is of lower temperature than the air, the heat exchange is from the air to the ware, and this condition of heat exchange is present throughout the travel of this zone because of the fact that the air is maintained at this higher temperature because of its own absorption of heat from the walls $e$.

As shown at the left of the graph, there is a sudden drop in the temperature of the air at the entrance end of the tunnel, this being due to the fact that the openings $g^2$ or leakage around the door permits of the escape of this air and the products of combustion do not reach to this particular portion of the walls of the tunnel. This sudden drop, however, does not provide for any damaging action, for the reason that it takes place within the temperature range below that which ends the critical temperature zone on a descending scale. While the ware is within this critical zone, there is this approximate uniformity in variation such as to not produce any conditions of sudden change such as would provide the stress action that produces shattering of the ware.

There is present within the tunnel, therefore, the presence of air with which the ware is being bathed, but this air is a circulating air and not a stagnant air. As will be understood, the introduction of 500 cubic feet of air per minute into a tunnel kiln such as is presented herein, necessarily provides for an actual and positive movement of air in the direction opposite that of the travel of the ware through the kiln. Not only is there a constant pressure being exerted on the travelling air through the increments of air being introduced, but the decreasing dimensions of the tunnel at the entrance end of the latter, tend to set up conditions of resistance such as will place the entire body of air within the tunnel under a pressure condition. In fact, the pressure of air within the tunnel is designedly such as approach, be equal to, or exceed the pressure within the product of combustion channels, $c'$, thus providing a resistance condition within the tunnel such as will tend to prevent leakage of products of combustion through the walls of the tunnel; and should such leakage take place despite the presence of this counter pressure or resistance, the small quantities that might enter the tunnel through the walls of the tunnel would become dissipated by reason of entering into a relatively large body of air, the latter travelling onward and not remaining at rest.

The air pressure within the tunnel can be controlled by controlling leakage around tunnel door or other escape such as the openings $g^2$, by the use of the usual dampers that are well known in the art and which would overlie the openings. For instance, the number of active openings might be reduced or might be increased by closing or opening some of these openings $g^2$, this being a well known expedient in the art. It will be understood, of course, that the total out-flow of air through these openings and through the door 10 at the entrance end of the tunnel, approximates that which is being introduced, while at the same time the conditions of pressure within the tunnel will be presented.

In practice, the volume of air being introduced remains substantially constant if it is found that the temperature of the ware at the peak zone is too high or too low, the remedy applied being that of changing the heat development conditions within the furnace. If the temperature of the ware be too high within the peak zone, the fuel consumption is cut down, while if the temperature of the ware at the peak zone is below that which is desired, the fuel supply is increased. This is referred to particularly to point out the fact that the presence of the circulating air or the air which is being moved through the tunnel with its direction of movement opposite that of the ware is not accidental, but is a real fundamental of the present invention. It will be noted, in this connection, that when the installation that has heretofore been referred to is put into service without the use of the flowing air, it is almost an invariable result that the ware, or a major portion of it, will be shattered; when, however, the kiln is operated with this air flow condition in which the air is constantly delivered, it constantly travels and is under a constant pressure within the kiln and in direct contact with the ware, shattering of the ware is the exception and is exceedingly infrequent, a result that is directly contrary to the beliefs and experiences of those who have been engaged in the art of firing decorated ceramic ware.

It will be understood, of course, that the method provides for a relatively low cost of operation with respect to fuel. This is due to the fact that the heated ware during the cooling operation is acting to heat up the air to cause the latter to itself act as a heating agent for the ware after the air has passed the peak zone. Hence the amount of heat required to bring the ware to the desired temperature is greatly decreased through the fact that this heated air is acting in conjunction with the radiated heat from the walls of the muffle, the circulating action of the air not only serves to provide a more uniform heating of the ware, but also tends to set up an action somewhat of the type of recuperation of the heat of the air through its being brought into contact with the heated walls of the muffle. In other words, the air, when brought to the peak temperature as it passes through the cooling zone of the kiln, does not lose its ability to heat with rapidity, due to the fact that it is being constantly subjected to the recuperating action set up by these walls as the air travels onward, so that the loss of heating ability is a gradual one rather than sudden, the air cooperating with the walls to provide a combined circulating and radiating activity within the heating zone of the kiln. As a result, the fuel requirements are greatly reduced and the cost of operation is correspondingly reduced.

As compared with the activities of the periodic muffle kiln—the only one that has been employed under commercial production conditions in connection with this third stage of operation—the use of the tunnel type of kiln under the method of operation presented herein provides another very material saving, not only as to time required to complete the cycle, but also in the character of the labor employed. With the periodic type, it is necessary to introduce the ware into a cool kiln, then bring the latter to its peak temperature, and then permit the oven to cool, after which the ware is removed; the introduction of air into an oven of this type when used for this third stage action is practically barred in practice for the reason that there is no way of preheating the air so as to avoid the wide variation in temperature between air and ware, it being readily understood that there is no circulation of fresh air possible within a kiln of this type so that at any particular heating temperature, the air would vary from that temperature by only 100° F. for instance; any attempt to introduce air into the kiln would be simply to increase the variation between air and ware as the temperature within the kiln increased, and it would not be possible to provide a circulation within the kiln itself and have that circulation provided with a constant supply of fresh air. Should an attempt be made to create a circulation within the kiln by the use of a fan therein, the air being circulated would be the same air, this air being the equivalent of stagnant air, the movement of the air within the kiln not changing this condition.

Obviously, the labor required to operate a kiln under the method presented herein can be of the unskilled type, whereas the operation with the periodic type of muffle kiln and other types requires the use of skilled labor in order to prevent the conditions of shattering. This will be understood from the fact that the presence of the air travelling in the direction opposite the ware and having a heat exchange action between the two travelling elements, tends to eliminate the conditions of sudden changes, such, for instance, as might come from an unskilled workman attempting to replenish the source of heat or cause the furnace to operate at a higher heat. The heated air coming from the cooling zone acts to tend to maintain the heat conditions, should the temperature of the products of combustion seemingly be reduced, and the air will tend to take up excess heat from the walls of the muffle should the source of heat tend to provide for overheating; the flowing air thus acts as an equalizer so as to maintain generally a comparatively uniform action. In practice, pyrometer readings at different points on the heating side adjacent the peak zone will give the operator a general idea of the heat conditions within this particular zone, and enable him to control the source of heat, he knowing that with this control the action within the remainder of the kiln will provide for the general uniformity.

As will be understood, of course, the rate of temperature reduction within the cooling zone is somewhat higher than would be the rate if the air were not present. In other words, assuming a closed tunnel cooling zone of the same length as is employed in practicing the present method, but in which the air supply was omitted, and assuming the same ware, the same peak temperature of the ware and the same rate of advance of the ware, as in the practice of the present invention, the ware would reach the exit end of the kiln at a much higher temperature than is the case when practicing this method, the introduction of the air thus increasing the rate of cooling above that of the natural rate of cooling such as would be provided in a tunnel without the air supply; to produce a cooled ware of the same temperature as is found at the exit end of the tunnel in the present invention, would require an additional length of the cooling so as to permit the ware to reach the desired temperature. As a result, the tunnel itself, in practicing the present invention, is of a materially less length, thus requiring a shorter period for the completion of the cycle on any ware carried by a particular car so that there is an economy of time required to complete the cycle.

And this is true also in certain respects on the heating of the tunnel, it being possible to provide for an increasing rate of advance because of the fact that the variation between the air and the ware is more or less uniform, so that ware is not subjected to sudden changes. In addition, the fact that circulation is added to radiation as the heating source enables this result to be obtained for the reason that the circulation brings the heated air to all parts of the car and its content, and hence does not produce a condition where the ware adjacent the side walls of the muffle become overheated while the ware in the middle of the tunnel remains underheated, so that there is less requirement for a gradual rate of advance, since it is not necessary to maintain the ware sufficiently long within a particular zone as to give all parts of the car the opportunity of being brought practically to the same heat.

It is to be understood, of course, that the underlying feature of the present invention is the discovery that ceramic ware can be brought to its peak zone for decorative firing while the ware is itself bathed with air circulated and under pressure. The entire development of the commercial art has been contrary to this type of action. When the installation referred to was discussed with those experienced in the firing of decorated ceramic ware, the opinion was universally expressed that it was impossible to provide commercial success, because the result would inevitably set up the most favorable conditions leading to shattering of the ware. Not only was this opinion refuted by the installation in action, but it has been found that the losses from "spitting out," "dunting" over-firing or under-firing, burned gold or gold improperly set, as well as destruction or deterioration of gold or colors from stagnant atmosphere, has been reduced to such an extent as to make them relatively small, even as compared to the prior practice. In addition, the gold and the colors have a smoothness and bright, glossy and lustrous appearance such as has heretofore been unobtainable in any other type of muffle kiln.

As heretofore pointed out, the particular construction of the kiln shown in the drawings is illustrative only, the kiln shown being simply representative of various types of tunnel kilns that might be employed in practicing the method. A specific construction for carrying out the method is shown in the companion application heretofore identified.

It will be understood, however, that while we have herein shown and described one general way in which the present invention may be carried out, the invention is not designed to be limited because of this particular disclosure, since the necessity and exigencies of a particular use or type of use may require variations both in structure and particular development of the method itself; because of these facts we desire to be understood as reserving the right to make any and all such changes or modifications in the structure or method as may be found desirable or essential in so far as the same may fall within the spirit and scope of the invention as expressed in the accompanying claims when broadly construed.

What we claim is:—

1. The art of firing articles in a kiln which consists in subjecting the articles to a firing heat free from products of combustion and concurrently therewith to a flow of air in direct contact with the articles or containers therefor.

2. The art of firing articles in a kiln which consists in subjecting the articles to a firing heat free from products of combustion while maintaining a flow of air under pressure in direct contact with said articles, or containers therefor.

3. The art of firing articles in a kiln which consists in subjecting the articles to a firing heat within the firing chamber of the kiln with the heat applied exteriorly of the firing chamber of the kiln and maintain the firing chamber free from products of combustion, and concurrently therewith causing a flow of air in the firing chamber past the articles being fired.

4. The art of firing articles in a kiln which consists in subjecting the articles to a firing heat with the firing chamber of the kiln with the heat applied exteriorly of the firing chamber of the kiln and maintain the firing chamber substantially free from products of combustion and maintaining an air pressure within the firing chamber and a flow of air past the articles being fired.

5. The art of firing articles in a kiln which consists in subjecting the articles to a firing heat within the firing chamber of the kiln with the heat applied exteriorly of the firing chamber of the kiln and maintain the firing chamber substantially free from products of combustion, and maintaining a circulation of air under pressure through the firing chamber and around the articles being fired in the chamber, and in contact with said articles.

6. The art of firing articles in a kiln which consists in subjecting the articles to a firing heat and maintaining a constant internal and substantially equal air pressure throughout the length of the firing chamber of the kiln by compensating for variations in expansion of the traveling air at different points throughout the length of the chamber due to different degrees of heat at different parts of the chamber, the articles being fired in said chamber in the presence of said air flow.

7. The art of firing articles in a kiln which consists in moving said articles in one direction through the firing chamber of the kiln with the firing chamber substantially free from products of combustion, and in producing a flow of air through the chamber during the firing operation with the direction of air flow opposite to the direction of movement of said articles.

8. The art of firing articles in a kiln having a comparatively long and narrow firing chamber, and which consists in moving said articles in one direction through the firing chamber, and producing a flow of air through the chamber in a direction opposite to that of the movement of the articles and under a substantially uniform pressure throughout the length of the firing chamber, the air flow path being independent of the flow path of the products of combustion to prevent air contamination by the products of combustion during passage of the air in contact with the travelling articles.

9. The art of firing articles in a kiln which consists in passing the articles through the firing chamber of the kiln in one direction and maintaining a flow of air through the chamber during the firing operation in a direction opposite to that of the movement of the articles with the air flow maintained at a constant pressure throughout the length of the chamber by compensating for the difference in expansion of the traveling air at different parts of the chamber by a variation in the cross-sectional area of the chamber.

10. In the art of decorating ceramic ware, the method of rendering the applied decorations permanent which consists in subjecting the ware with the applied decoration to a "firing" cycle while the ware is bathed with flowing air.

11. In the art of decorating ceramic ware, the method of rendering the applied decorations permanent which consists in subjecting the ware with the applied decoration to a "firing" cycle, and maintaining the ware bathed with flowing air throughout the cycle.

12. In the art of decorating ceramic ware, the method of rendering the applied decorations permanent which consists in establishing a "firing" cycle travel path for the ware, and moving the ware with the applied decoration through such path in presence of and in contact with flowing air.

13. In the art of decorating ceramic ware, the method of rendering the applied decorations permanent which consists in establishing a "firing" cycle travel path for the ware, and moving the ware with the applied decoration through such path while maintaining the ware bathed with flowing air substantially throughout the period of travel of the ware through such path.

14. In the art of decorating ceramic ware, the method of rendering the applied decorations permanent which consists in establishing a "firing" cycle travel path for the ware, moving the ware with the applied decoration through such path, and flowing air through such path concurrently with the movement of the ware therethrough, the movement of ware and air through the path being in opposite directions.

15. In the art of decorating ceramic ware, the method of rendering the applied decorations permanent which consists in establishing a "firing" cycle travel path for the ware, moving the ware with the applied decoration through such path, and flowing air through such path under pressure concurrently with the movement of the ware therethrough.

16. In the art of decorating ceramic ware and wherein the ware with the applied decoration is subjected to a "firing" cycle action in which the peak temperature is found within the "tender" or critical temperature zone of the ware, the method of rendering the applied decorations permanent which consists in establishing a "firing" cycle travel path for the ware in which the peak temperature zone is at an intermediate portion of the travel path, moving the ware throughout the length of such travel path, and concurrently bathing the ware with flowing air.

17. In the art of decorating ceramic ware and wherein the ware with the applied decoration is subjected to a "firing" cycle action in which the peak temperature is found within the "tender" or critical temperature zone of the ware, the method of rendering the applied decorations permanent which consists in establishing a "firing" cycle travel path for the ware in which the peak temperature is at an intermediate portion of the travel path, moving the ware throughout the length of such travel path, and concurrently establishing a flow of air in such path, with the flowing air bathing the ware.

18. In the art of decorating ceramic ware and wherein the ware with the applied decoration is subjected to a "firing" cycle or critical temperature zone of the ware the method of rendering the applied decorations permanent which consists in establishing a "firing" cycle travel path for the ware in which the peak temperature zone is at an intermediate portion of the travel path, moving the ware throughout the length of such travel path, and concurrently establishing a flow of air in such path with the flowing air bathing the ware, the movement of the air and ware through the path being in generally opposite directions.

19. In the art of decorating ceramic ware and wherein the ware with the applied decoration is subjected to a "firing" cycle action in which the peak temperature is found within the "tender" or critical temperature zone of the ware, the method of rendering the applied decorations permanent which consists in establishing a "firing" cycle travel path for the ware in which the peak temperature zone is at an intermediate portion of the travel path, moving the ware throughout the length of such travel path, and concurrently establishing a flow of air in such path with the flowing air bathing the ware and with a portion of the air flow path deviating from a straight line path.

20. In the art of decorating ceramic ware and wherein the ware with the applied decoration is subjected to a "firing" cycle action in which the peak temperature is found within the "tender" or critical temperature zone of the ware, the method of rendering the applied decorations permanent which consists in establishing a "firing" cycle travel path for the ware in which the peak temperature zone is at an intermediate portion of the travel path, moving the ware throughout the length of such travel path and concurrently establishing a flow of air in such path with the flowing air bathing the ware and with a portion of the air flow path following a tortuous path through the ware.

21. In the art of decorating ceramic ware and wherein the ware with the applied decoration is subjected to a "firing" cycle action in which the peak temperature is found within the "tender" or critical temperature zone of the ware, the method of rendering the applied decorations permanent which consists in establishing a "firing" cycle travel path for the ware in which the peak temperature zone is at an intermediate portion of the travel path, moving the ware throughout the length of such travel path, and concurrently establishing a flow of air in such path with the flowing air bathing the ware and with the flow of air within that portion of the ware travel path which leads to the peak temperature zone being generally in a tortuous path to cause air movement angularly to the direction of travel of the ware.

22. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in subjecting the ware with the applied decoration to the complete "firing" cycle while the ware is bathed with flowing air having its temperature varied in general correspondence with the temperature variations of the ware.

23. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in subjecting the ware with the applied decoration to the complete "firing" cycle while the ware is bathed with flowing air having its temperature varied in general correspondence with the temperature variations of the ware, and with the peak temperatures of air and ware produced in approximate concurrence.

24. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in subjecting the ware with the applied decoration to the complete "firing" cycle while the ware is bathed with flowing air having its temperature varied in general correspondence with the temperature variations of the ware, and with the temperatures of the air and ware of approximately equal value within the peak temperature zone.

25. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in establishing a "firing" cycle travel path for the ware with the peak temperature zone of the ware intermediate the ends of such travel path, moving the ware through such travel path, and concurrently establishing a flow movement of air substantially through said travel path to bathe the ware, with the air flow movement in a direction such as to produce heat exchange activity between the air and ware at substantially all points of such travel path beyond the peak temperature zone.

26. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in establishing a "firing" cycle travel path for the ware with the peak temperature zone of the ware intermediate the ends of such travel path, moving the ware through such travel path, and concurrently establishing a flow movement of air substantially through said travel path to bathe the ware, with the air flow movement in a general direction opposite the direction of movement of the ware to set up the conditions of heat exchange between air and ware beyond the peak temperature zone, the differences in temperature values of air and ware effective in producing the heat exchange activity being less than 200° F.

27. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in establishing a "firing" cycle travel path for the ware with the peak temperature zone of the ware intermediate the ends of such travel path, moving the ware through such travel path, and concurrently establishing a flow movement of air substantially through said travel path to bathe the ware, with the air flow movement in a general direction opposite the direction of movement of the ware to set up the conditions of heat exchange between air and ware beyond the peak temperature zone, with the heat exchange active from air to ware in the portion of the travel path in advance of the peak zone, and from ware to air in the portion of such path following the peak zone.

28. In the art of decorating ceramic ware, wherein the ware with the applied decoration is subjected to a "firing" cycle in which the peak temperature is found within the "tender" or critical temperature zone of the ware, the method of rendering the applied decorations permanent by the activities of the "firing" cycle which consists in establishing a "firing" cycle travel path for the ware with the peak temperature zone of the ware intermediate the ends of such travel path, moving the ware through such travel path, and concurrently establishing a flow movement of air substantially through said travel path to bathe the ware, with the air flow movement in a general direction opposite the direction of movement of the ware to set up the conditions of heat exchange between air and ware beyond the peak temperature zone, with the heat exchange active from air to ware in the portion of the travel path in advance of the peak zone, and from ware to air in the portion of such path following the peak zone, the differences in temperature values of air and ware effective in producing such heat exchange being less than 200° F.

29. In the art of decorating ceramic ware wherein the ware with the applied decoration is subjected to a "firing" cycle in which the peak temperature is found within the "tender" or critical temperature zone of the ware, the method of rendering the applied decorations permanent by the activities of the "firing" cycle which consists in establishing a "firing" cycle travel path for the ware with the peak temperature zone of the ware intermediate the ends of such travel path and with the travel path of enlarged cross-sectional dimensions in advance of the peak temperature zone, a zone leading from the entrance of decreasing cross-sectional dimensions, moving the ware through such travel path, and concurrently establishing an air flow path leading from adjacent the discharge end of the ware travel path and traversing the ware travel path into such entrance zone and discharged within such zone, the air flow being such as to produce conditions of air pressure within such flow path active to counteract pressure of products of combustion applied external of the travel path walls, the flowing air bathing the ware travelling in the travel path.

In testimony whereof we affix our signatures.

CHARLES T. HOLCROFT.
CHARLES E. DOLL.